United States Patent [19]
Petersen et al.

[11] 3,797,306
[45] Mar. 19, 1974

[54] TIRE COMPLIANCE TEST MACHINE

[75] Inventors: Niel R. Petersen, Hopkins; Paul S. Petersen, Minnetonka, both of Minn.

[73] Assignee: MTS Systems Corporation, Minneapolis, Minn.

[22] Filed: Sept. 25, 1972

[21] Appl. No.: 291,720

[52] U.S. Cl. ................................................. 73/146
[51] Int. Cl. ........................................... G01m 17/02
[58] Field of Search ....................................... 73/146

[56] References Cited
UNITED STATES PATENTS 3,604,245   9/1971   Atelian .............................. 73/146
3,546,936  12/1970   Tarpinian et al. .................. 73/146

Primary Examiner—Donald O. Woodiel
Attorney, Agent, or Firm—Dugger, Johnson & Westman

[57] ABSTRACT

A tire compliance test machine which mounts a tire to be tested on a parallel linkage arrangement that maintains the tire in a preselected relationship to a road wheel against which the tire is loaded, and which is mounted so that the loading forces are transferred directly between the road wheel and the tire being tested without having a large, cumbersome frame to carry the load. The test machine includes means for adding camber and steer motions to the tire being tested.

10 Claims, 5 Drawing Figures

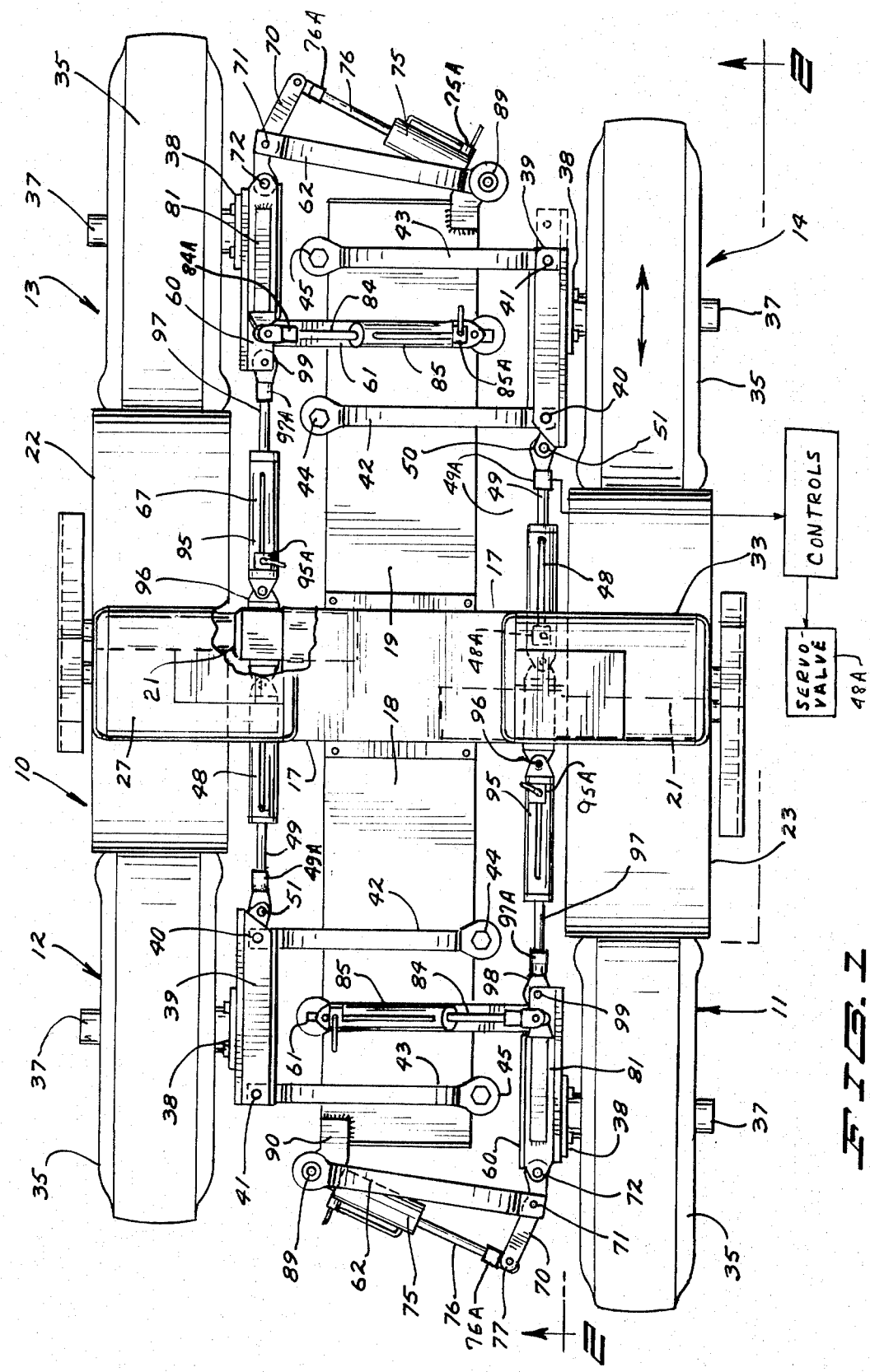

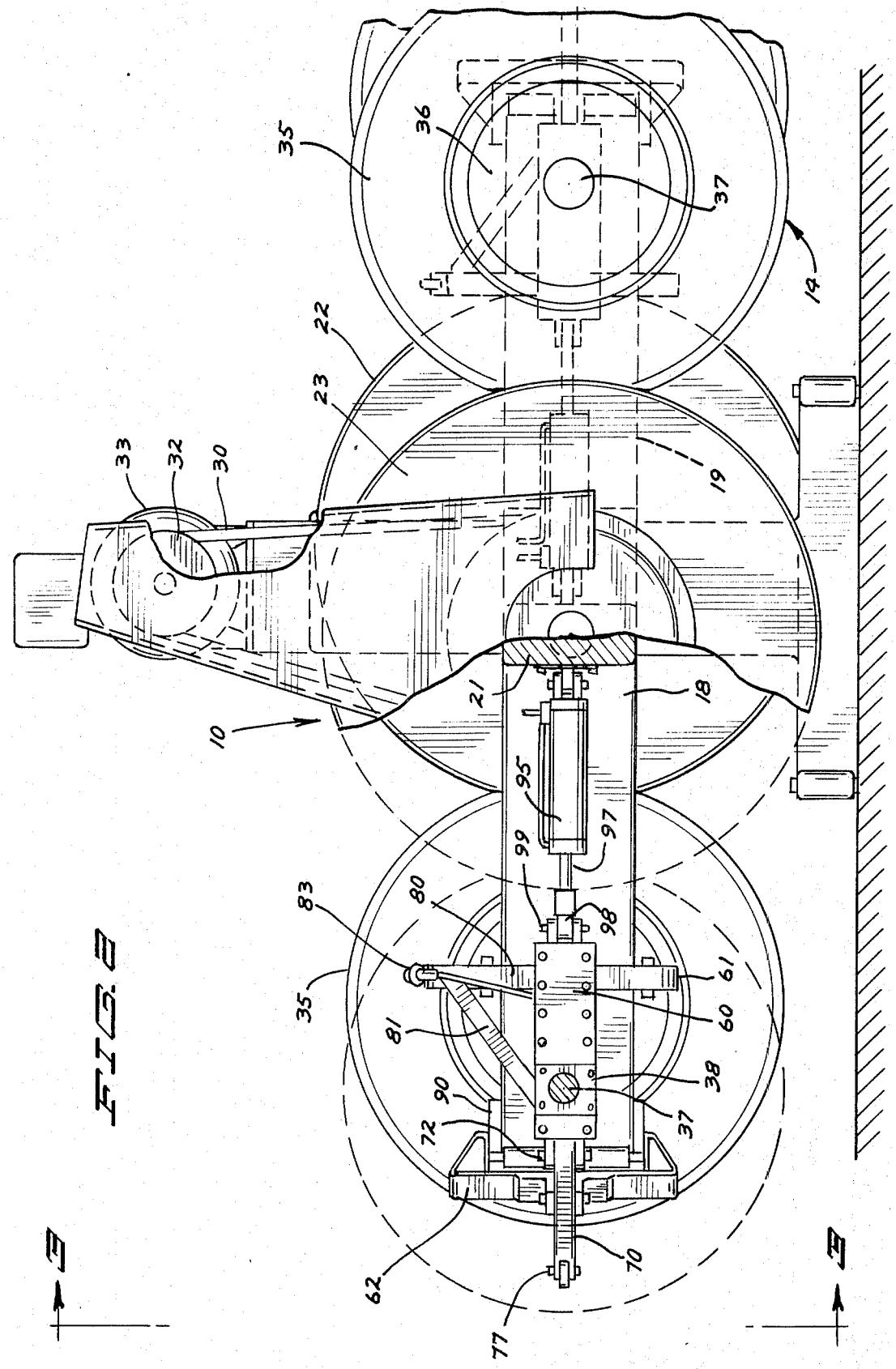

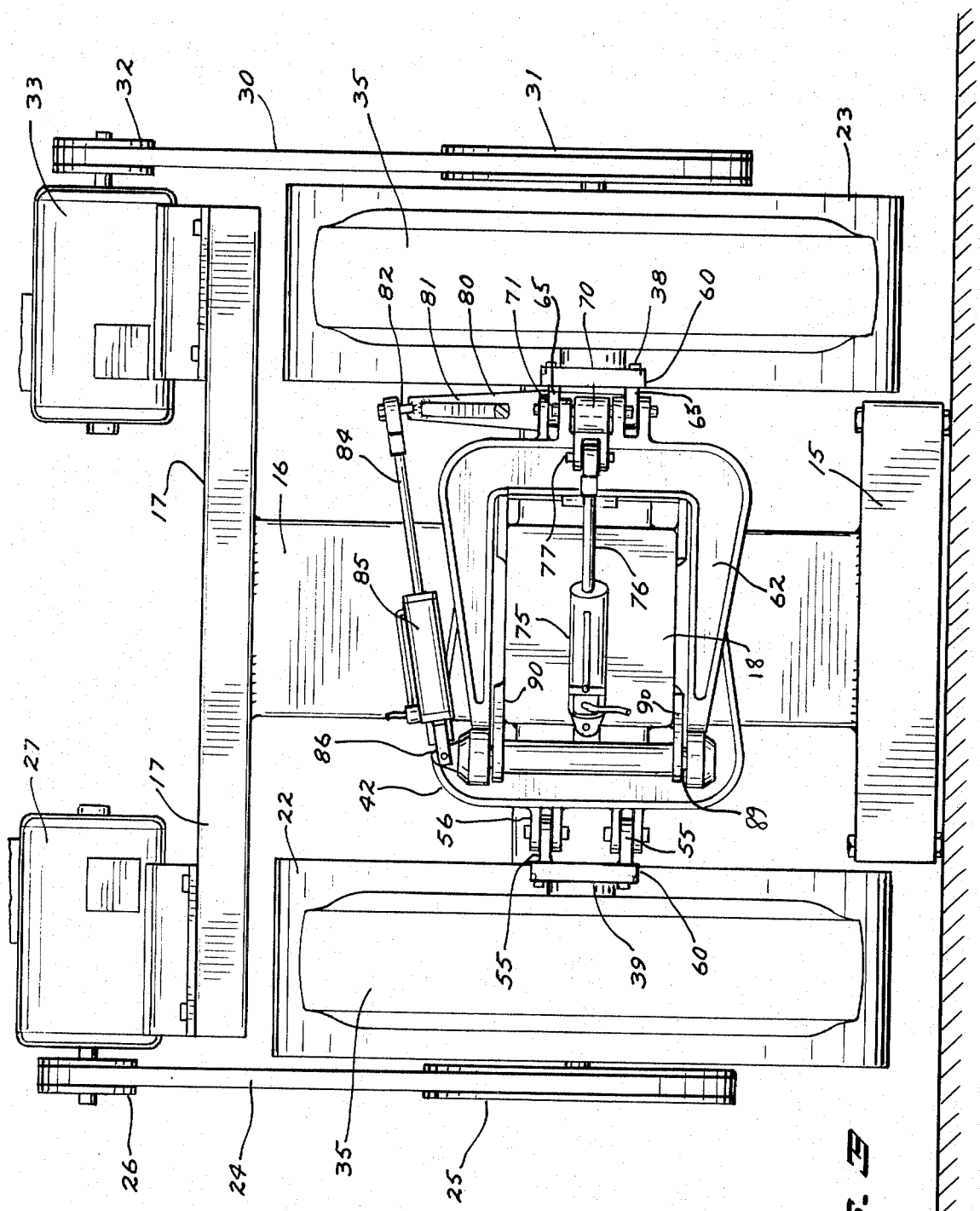

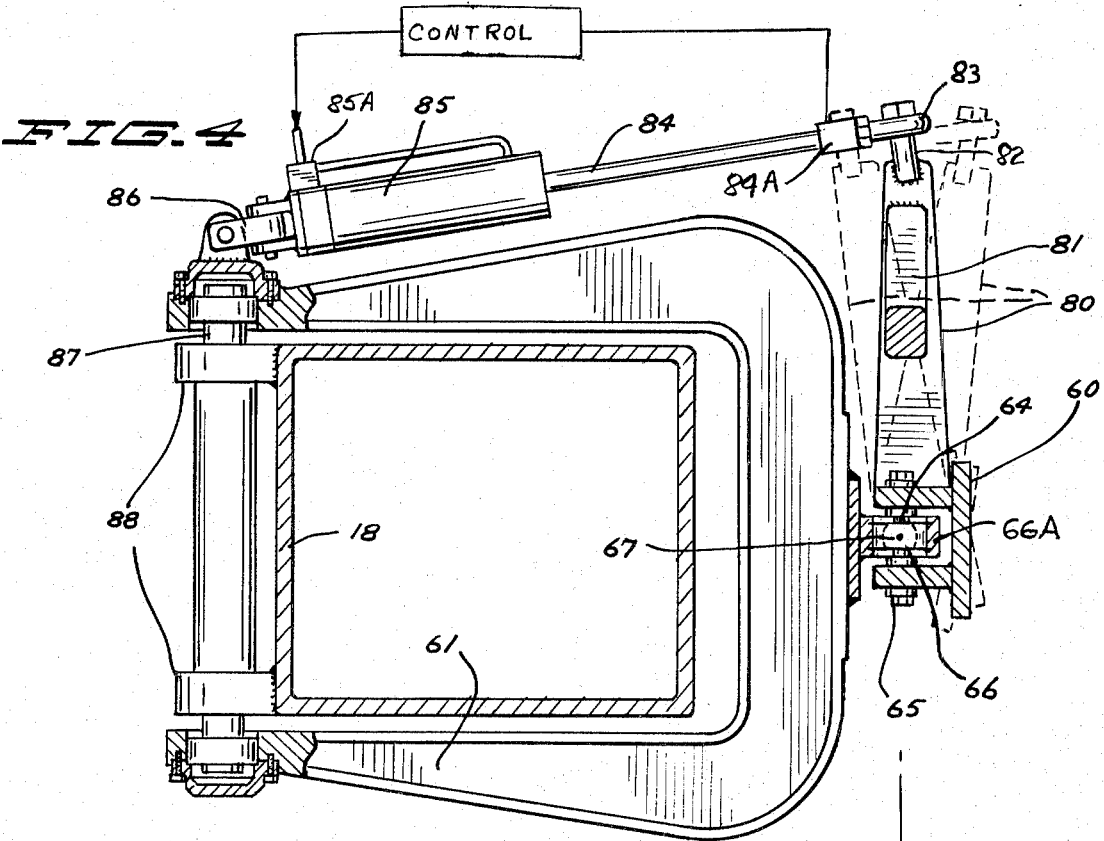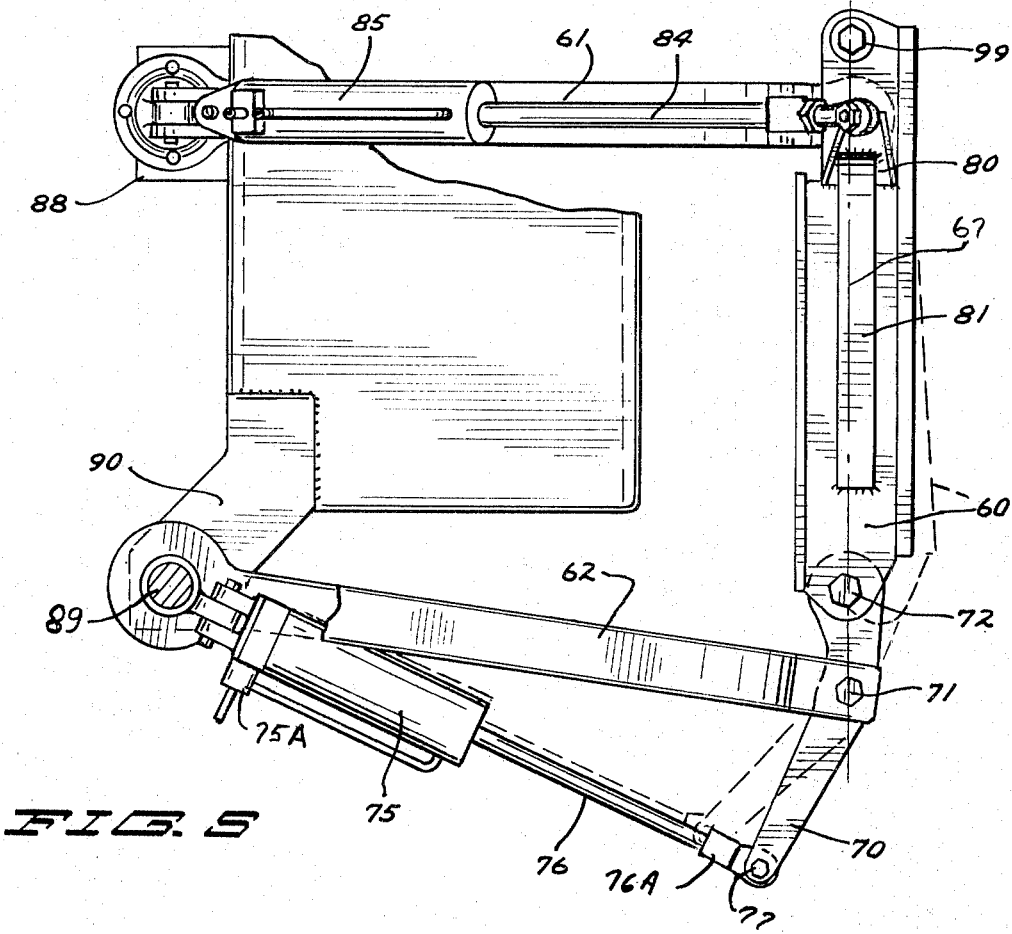

TIRE COMPLIANCE TEST MACHINE

BACKGROUND OF THE INVENTION

1. Field of the Invention.

The present invention relates to tire compliance testing machines.

2. Prior Art.

In the prior art there are a number of tire testing machines of various kinds. For example, the U.S. Pat. to R. W. Obarski et al. No. 3,060,734, issued Oct. 30, 1962 shows a tire, wheel and/or brake testing apparatus. The device shown in this patent includes a large frame that is necessary for moving the tire into position against a testing wheel. The cumbersome mechanism increases the cost of constructing such a device and makes installation and servicing difficult. Likewise, a second patent to Obarski U.S. Pat. No. 3,206,973, issued Sept. 21, 1965, shows a testing apparatus operating a tire loading device on a lever arm principal, but the structure shown also requires a heavy frame for carrying the loads between the testing wheel and the tire that is being tested.

Another form of tire testing apparatus is shown in U.S. Pat. No. 3,543,576, issued Dec. 1, 1970 to Bishop, and again a large frame for supporting the unit is required. Another patent showing a tire testing apparatus which requires a very large frame not only to provide the movement toward and away from the road wheel utilized, but also for accomplishing the steer and camber movement is shown in the patent to H.D. Tarpinian et al., U.S. Pat. No. 3,546,936, issued Dec. 15, 1970.

None of these devices show an efficient, relatively light weight and accurate tire testing apparatus that can be easily instrumented to provide for all of the required loads and movements necessary for tire compliance testing the tires.

The Department of Transportation of the United States has enacted standards on tires, and a discussion of these standards, and a machine for testing tires is also shown in the March, 1971 issue of "Power Transmission Design" in an article entitled "New Testing Machine Helps Tires Meet Increasing Safety Checks," by R. L. Fuller.

SUMMARY OF THE INVENTION

The present invention relates to a tire compliance test machine utilizing a mechanism so that the tire being tested can be loaded directly against a rotating road wheel for testing purposes. The unit is mounted on a parallel linkage arrangement so that the tire will move into the road wheel under load in a proper relationship for accurate testing, and the mechanism will maintain the proper relationship throughout its travel. The means for loading the tire is mounted closely adjacent the road wheel at one end and the tire mounting mechanism at the other end so that the force generated by the loading means is transferred directly between the spindle supporting the road wheel and the spindle supporting the tire to be tested, thereby eliminating the need for an extra heavy frame and base for the machine.

In addition, the unit is mounted so that a steer movement can be placed on the tire being tested, and also the tire can be moved to place a camber movement on the tire during test operation.

Suitable controls can be provided within the skill of those in the art to adequately control and instrument the unit.

The unit is set up so that four different tire test stations can be operated simultaneously from one machine, and the construction saves space, and greatly minimizes the weight required because of the mounting and loading arrangement.

BRIEF DESCRIPTION OF THE DRAWINGS

FIG. 1 is a top plan view of a tire compliance test machine made according to the present invention;

FIG. 2 is a sectional view taken as on line 2—2 in FIG. 1;

FIG. 3 is an end view of the test machine of FIG. 1 taken on line 3—3 in FIG. 2;

FIG. 4 is an end view of a frame portion showing a typical yoke used for mounting the tire to be tested on the machine of the present invention; and FIG. 5 is a top plan view of a parallel link arrangement with the spindle support and camber control mechanisms attached.

DESCRIPTION OF THE PREFERRED EMBODIMENT

A tire compliance test machine illustrated generally at 10 is shown in its configuration as simultaneously providing means for testing four different tires, at four different stations. These stations are numbered 11, 12, 13, and 14, respectively, and are all mounted onto a common main support frame 15. The stations 11 and 13 are identical, and the stations 12 and 14 are identical in construction, and all of the stations include the same general tire mounting and loading mechanism of the invention. The testing stations 11 and 13, however, include means for providing camber and steer motions to the wheel spindle supporting the tire to be tested.

The main support frame 15 includes an upright center pedestal member 16 (see FIG. 3), that has laterally extending frame portions 17,17. In addition, a pair of fore and aft frame extension members 18 and 19, respectively are attached to the center pedestal 16 and are supported thereby in cantilever manner. The center pedestal 16 also has laterally extending portions which support a pair of laterally extending shafts 21. The shafts 21 have base portions that attach to the frame and as will be explained, support loading cylinders, and also the shafts include outer end portions that are turned down to mount bearings used for rotatably supporting large road wheels 22 and 23, on opposite sides of the test machine. The wheels 22 and 23 may be called road wheels or test flywheels. The wheels are rotatably mounted on the shafts 21 with bearings and are retained on the shafts 21 in a suitable manner. The outer peripheral surfaces of these wheels 22 and 23 are smooth, cylindrical surfaces generated around the axis of rotation of the wheels. The road wheels normally are metal and hollow. Each of the wheels 22 and 23 is independently driven by a separate electric motor and V belt drive. While a single V belt is shown for a drive, the drive can be of any desired form such as a "Poly-V" belt, or a plurality of V belts may be used.

As shown, the road wheel 22 is driven with a belt 24 through a pulley 25 that is drivably attached to the wheel 22, and the belt 24 in turn is driven by a drive pulley 26 on the output shaft of a drive motor 27. The motor 27 is attached to the outwardly extending frame portion 17. The road wheel 23 is also driven with a suitable drive assembly such as a V belt 30 driving through a pulley 31 that is driven by the belt 30, and the belt 30 is driven from a pulley 32 on the output shaft of an electric motor 33 of suitable design. The motor 33 is attached to a frame portion 17 positioned above the road wheel 23. The road wheels 22 and 23 can then be rotated about the axes of the shafts 21 at any desired rotational speed. The motors 27 and 33 are preferably direct current motors, and the speed of the road wheels can be changed as desired for different test criteria either with manual adjustment or other automatic controls. The road wheels are mounted about parallel axes, but the axes are offset in fore and aft directions.

Referring now specifically to the stations 12 and 14, which are designed to move a tire to be tested directly into the road wheels only, without any camber or steer movement of the wheels, it can be seen that the tires 35 are mounted onto suitable wheels 36 and are inflated as desired for testing. The wheels 36 in turn are rotatably mounted onto spiindles 37. The spindles 37 attach to spindle support plates 38, and the spindle support plates 38 are then attached to brackets 39. The mounting of the wheels is thus very similar to a wheel mounting on an automobile. The brackets 39 are then made so that the spindle support plates 38 can be moved to different individual positions along the brackets 39 for different diameter tires. The brackets 39 have a face with a plurality of adjustment holes into which the plate 38 can be fastened. The brackets 39 are pivotally mounted as at 40 and 41, respectively, on suitable bearings to a pair of parallel linkage yokes 42 and 43. The yokes 42 and 43 are typically shown in FIGS. 4 and 5, when the steer and camber movements are provided, and the yokes 40 and 41 are generally of this shape, comprisng U shaped members that straddle the frame beams 18 and 19, at the respective testing positions 12 and 14. The outer ends (open ends of the "U") of the U shaped brackets are pivotally mounted on the beams 18 and 19 with suitable shafts 44 and 45. The shafts 44 and 45 are attached to the respective beams 18 or 19 in a suitable manner and the end of the shafts hold the respective ends of the legs of the yoke. The yokes 42 and 43 therefore form a parallel linkage for mounting the brackets 39.

The brackets 39 in turn are controlled for movement toward and away from the road wheels 22 and 23 with suitable hydraulic cylinders 48 that have extendable and retractable rods 49 controlled through electrohydraulic servo valves 48A, in the usual manner. The cylinders act through load cells 49A which provide a feedback so that the actual load and the desired load from a function generator or computer may be used in a closed loop control for the servo valves. These controls are only typical of others that may be used if desired in a known manner.

The bases of cylinders 48 are attached directly to brackets fixed to the inner ends of shafts 21, and when the cylinders 48 are placed under fluid pressure to retract the rods 49 to apply a load to the respective tires 35, the rods 49 pull through rod ends 50 and through connecting pins 51 attached to ears on the brackets 39 so that a direct load is placed on the brackets 39 tending to pull them toward the corresponding road wheel 22 or 23. The load applied therefore travels only through the brackets 39, and back through the hydraulic cylinders 48 to the base of shafts 21 closely adjacent the road wheels. The loading force is carried by the shafts 21 for the road wheels and the frame therefore does not carry this load. The required weight and size of the frame is reduced substantially because the major part of the load is not transferred through the main machine frame, such as the beams 18 or 19 and pedestal 16. There are some moment loads carried in the linkage members due to the separation of the tire path and the piston rod center lines.

The plane of movement of tires 35 remains parallel to their initial plane of movement during test loading. The tires will be moved into the road wheels on a line which is a radius of the road wheel and do not rend to cock, skew or move in an arc as they are moved into the road wheel. As can perhaps best be seen in FIG. 3, the attachment for the brackets 39 to the bases of yokes 42 and 43 can be interlocking ears on the brackets and yokes 42 and 43 with pins passing through the ears. For example, the brackets 39 can have ears 55 thereon, and the yokes can have ears 56 thereon with the pins 41 and 40 merely passing through the ears to provide the pivot connection for the parallel linkage formed by the yokes 42 and 43 with the brackets 39. The mounting shafts for the opposite open ends of the brackets 44 and 45 may be attached to the beams 18 and 19 through suitable bearings. The construction of the shafts 44 and 45 corresponds to the shafts used in the yokes at the other test station which will be described.

At test stations 11 and 13, as shown, means are provided for tilting the spindles 37 used in these stations out of a parallel relationship with the axis of rotation of the corresponding road wheels, to provide a "camber load" and also means are provided to rotate the tires in a plane at right angles to the normal direction of loading against the wheel to provide a "steer loading" under control.

The parallel link yoke arrangement is maintained as before, but the brackets are modified to accomplish the "camber" and "steer" loading. At stations 11 and 13, there are tires 35 mounted on suitable wheels 36, as in the stations 12 and 14, and these wheels are rotatably mounted on spindles 37 that are fixed to a spindle adapter or mounting plate 38. However, in this particular instance, the spindles 37 and the mounting plates 38 are attached to mounting brackets 60. Brackets 60 are connected to a parallel link arrangement, and this parallel link arrangement in this particular instance includes a first yoke 61, and a second yoke 62 which are U shaped as in the previous form of the invention, but are connected to the brackets 60 in a different manner.

The yokes 61 are perhaps best seen in FIG. 4 are connected to the brackets 60 with a pivot pin 64 that permts pivoting in a vertical direction, and this pin 64 is attached to suitable spaced plates 65 forming part of the brackets 60. The pin 64 also passes through a spherical bearing assembly 66 that permits a limited amount of movement from the vertical position of the pin 60, and therefore a limited amount of movement of the brackets 60 about an axis at right angles to the vertical direction, for example, an axis indicated by the dot 67 in FIG. 4. The bearing assembly 66 is mounted in a housing 66A that is fixed to the separate yoke.

Each of the yokes 62 is pivotally connected to a lever 70 and as perhaps best seen in FIGS. 3 and 4, the levers 70 are pivotally mounted between ears on the yokes 62 with pins 71 which are positioned so the pivot axes thereof are vertical. Each of the levers 70 also have portions which extend beyond the yoke 62 toward bracket 60 and which is pivotally mounted with a pin 72 to the plates 65 of the bracket 60. The end portion of the lever 70 is positioned between plates 65. The pin 72 is parallel to the pin 64 for mounting the yokes 61. The connection for the end portion of the lever 70 to the plates 65 also includes a spherical bearing identically mounted to the bearing 66, so that both mounting points for the bracket 60 permit pivotal movement to their connecting members about upright axes (the axes of pins 64 and 72), and also about a horizontal axis 67 at right angles thereto. The axis 67 is preferably along a radius line of the respective road wheel 22 or 23. The axis 67 forms the "steer" axis for the test machine.

The lever 70 is attached at its opposite end to a hydraulic cylinder, or other force generating mechanism, indicated at 75 which has a rod 76. The hydraulic cylinder is a double acting, servo valve controlled cylinder used to fix the position of the lever about the axis of the pin 71. Movement of the lever by the cylinder 75 moves the end of the bracket 60 where pin 72 is mounted, about the axis of the pin 71 and also the bracket 60 will then pivot about the axis of pin 64 where bracket 60 is connected to yoke 61. The cylinder 75 can be replaced with a threaded rod that can be changed in length to change the positioning of the lever 70, and therefore the position of the pin 72, if desired. The movement of the lever 70 moves the bracket 60 in a plane substantially parallel to the axis of rotation of the road wheels 22 or 23 to tilt the axis of rotation of the tires being tested to provide a "camber" loading. The rod 76 has a rod end 77 pivotally mounted about to the end of the lever 70 with a suitable pin that is parallel to the pin 71. A load cell 76A may also be used for delivering a load signal, for camber loading and the load cell output may be used for feedback in a closed loop controlling the servo valve 75A in response to a command signal source. The control may be any desired arrangement.

In normal operation, the position of this lever 70 can be fixed by the cylinder 75 or other force member to hold the spindle 37 which is attached to the bracket 60 in a desired position. With no camber load the axis of spindle 37 for these stations 11 and 13 would be parallel to the axes of shafts 21.

To provide for control of the steering motion about axes 67 the brackets 60 each include a lever arm 80 fixed thereto with a brace 81 extending back down to the brackets 60. The lever arm 80 has an upwardly extending connector stud 82 that is attached to a rod end 83 on the end of an extendable and retractable rod 84 of a double acting hydraulic cylinder 85 at each station. The cylinder 85 may have servo valves 85A and load cells 84A for the control function. Each hydraulic cylinder 85 in turn is attached with a suitable connector bracket 86 back to the yoke 61, substantially aligned with the vertical axis of the pin or shaft 87 that is used for mounting the respective yoke 61 to the beam 18 or 19. The shaft 87 is suitably mounted in bearings that are attached to the side of the beam 18 in the usual manner. There also are bearings between the shaft 87 and the ends of the legs of yoke 61.

Likewise, a shaft 89 is attached to hold the outer ends of the yoke 62. The shaft 89 is connected with suitable brackets 90 to the beam 19. The end of shaft 89 also may be connected to the legs of the yoke with bearings so that the yoke 62 also rotates easily with respect to its mounting.

The loading of the brackets 60 and the tires 35 mounted thereon toward the road wheel 22 or 23 is again accomplished by moving each bracket 60, as constrained by the yokes 61 and 62 with a hydraulic cylinder. The yokes 61 and 62 are connected to the brackets 60 and to the beams 18 and 19, respectively so that they again form parallel support linkages for the brackets 60 at stations 11 and 13. The pivot pins 89 and 87 for the yokes 61 and 62 are parallel to the pins 72 and 64. At each station the effective connection for pivoting of the yoke 62 with respect to the bracket 60 when the bracket 60 is moved toward and away from the road wheel is pin 72. Thus a plane defined by the axes of pin 72 and pin 89 is parallel to a plane defined by the axes of pins 87 and 64.

A hydraulic cylinder 95 is attached as at 96 to a coupling bracket fixed to the respective support shaft 21 for the road wheel 22 or 23. The cylinders 95 are attached as close as practical to the road wheels. Each hydraulic cylinder 95 is controlled through a suitable servovalve 95A when operated will extend or retract a rod 97 that is connected to a rod end 98. A load cell 98A is used to measure the load applied by the cylinder 95 and the signal therefrom may be used as a feedback signal in a closed loop control to insure the desired load is being applied. The application of load can be from a conventional command signal source or other device. Loading a bracket 60 with the cylinder 95 moves the respective tire 35 attached to this bracket 60 into engagement with the road wheel 22 or 23, and the force with which the cylinder 95 pulls the tire 35 against the road wheel is transferred directly to the road wheel mounting shaft adjacent the end thereof, and directly from the bracket 60 through the mounting member 38 to the wheel spindle 37 so that a major portion of the load does not have to pass through the frame members 18 or 19, or through a mounting block.

In operation as shown in FIG. 1, the direct loading at station 11 and 13 is as described in connection with station 12 and 14. Parallel links support the brackets 60, and thus the wheel and tire to be tested are directly loaded. The tire maintains its orientation in space as it moves relative to the road wheel as the tire is loaded or in other words the plane of rotation of the tire remains parallel to a reference plane when moved by the cylinders 95. Of course, the camber and steer motion can be added if desired but the parallel linkage insures that indiscriminate changes in camber loading or steer loading do not occur. The tire moves into the road wheel in its desired testing position. There is no arcuate movement of the tire as it is pressed into the road wheel.

The desired "steer" movement about axis 67 is provided by extension or retraction of the cylinder 85 from its position shown in FIG. 4. The brackets 60, and the attached spindle and tire can be tilted about the axis 67 to achieve steering load as the tire is moved against the road wheel 23 of the tire 35 at stations 11 and 13. The steer angle is independently adjustable and the parallel linkage maintains the orientation of the tire at a desired steer angle as it is loaded.

Further extension or retraction of the rod 76 of cylinder 75 will pivot the lever 70 to move the pin 72 in or out with respect to its position shown in solid lines in FIG. 1, and this will tilt the axis of the spindle 37 out of parallel arrangement with the road wheel support shafts, and will provide a camber load on the tire. The brackets 60 tilt about the pin 64 where the brackets attach to the respective yokes 61 and the tire then will be eccentrically loaded like it would be from camber. The amount of camber is controlled through cylinder 75, or other linkage, completely independently of the steering control and also independently of the direct loading force from cylinder 95. The amount of camber angle is not substantial and therefore the slight shifting of pin 72 is not consequential insofar as operation of the parallel links supporting the brackets 60 is concerned. The links are effectively parallel and the camber placed on the spindle 37 will be maintained by the parallel links as the tire is moved against the road wheel.

The linkages may provide loading not only in a straight line against the road wheels 22 and 23, but through simple use of spherical seated bearings which are utilized at all of the rod ends, and at the connecting pins 72 and 64, a steering effect can be introduced to the tire 35 at stations 11 and 13, and by operating the hydraulic cylinder 75, or other means provided for controlling the position of lever 70, a camber loading can be introduced to move the spindle 37 into a camber position. The geometry of the loading simplifies the frame, insures accurate loading and control and makes the entire machine very compact.

In order to minimize any errors in the loading, the spindles 37 are placed on the respective support brackets in position so that the effective planes of the supporting parallel links for the brackets are substantially perpendicular to the desired plane of movement of the tires when the tires are loaded against the wheel. Then any shifting of the tire in axial direction along the surface of the road wheel is reduced as the load on the tire, and therefore the deflection of the tire, is changed.

The controls for the various cylinders are shown only schematically because servo valves are well known and means for controlling such valves also are well known. The servo valves of course will be connected to hydraulic fluid under pressure from a pump or other source.

It should also be noted that if desired instrumentation for measuring loads can be applied directly to the spindles 37. The signals would be taken off the spindles with known slip ring assemblies.

What is claimed is:

1. In an apparatus for testing tires or the like, a rotating wheel having an outer surface against which the tires to be tested may run, means rotatably supporting said wheel, means to rotate said wheel, a tire mounting means including a tire support member, means to mount said tire mounting means for movement toward and away from said wheel including parallel linkage means having first and second ends, means to pivotally mount first ends of said parallel linkage means to said tire support member about parallel pivotal axes, means to mount second ends of said parallel linkage means to said apparatus, and means to move said tire mounting means in direction toward and away from said wheel comprising power means connected to said means rotatably supporting said wheel closely adjacent said wheel on one side thereof and said power means also being pivotally connected to said support member about an axis positioned closely adjacent a tire mounted on said tire support member, whereby loads generated by said power means force a tire on said tire mounting means and said wheel to contact each other and said loads are carried substantially only by said tire mounting means and said means rotatably supporting said wheel.

2. The combination as specified in claim 1 wherein said means to pivotally mount said parallel linkage means to said support member includes means to permit movement of said support member about an axis substantially perpendicular to the parallel axes, and first controllable means mounted with respect to said parallel linkage means and said support member to control the movement of the support member about said substantially perpendicular axis.

3. The combination as specified in claim 2 wherein said parallel linkage means includes link members, and second controllable means to permit changing the effective length of at least one of said link members to thereby cause a tire supported by said support member to be rotated about an axis to provide camber loading of said tire when it is moved into contact with said wheel.

4. The combination as specified in claim 2 wherein said axis substantially perpendicular to the parallel pivotal axes comprises an axis positioned parallel to a plane defined by the parallel pivotal axes at the first ends of said parallel linkage means.

5. An apparatus for testing tires or the like including a frame, a road wheel, means to rotatably mount said road wheel on said frame, means to rotate said road wheel, said road wheel having a substantially cylindrical outer surface, means to support a tire for rolling engagement with the outer surface of said road wheel, said means to support a tire comprising a mounting bracket, and a pair of links pivotally mounted to said mounting bracket about substantially parallel spaced apart axes at first ends of said links, and means to pivotally mount said links to said frame about substantially parallel axes at second ends thereof to form a parallel linkage means for mounting said mounting bracket, and power generating means for moving said mounting bracket as constrained by said parallel linkage means toward and away from said road wheel.

6. The combination as specified in claim 5 wherein said power generating means comprises a hydraulic cylinder, means to mount a first end of said hydraulic cylinder to said means rotatably mounting the road wheel closely adjacent a lateral side of said road wheel, and means to mount a second end of said hydraulic cylinder to said mounting bracket.

7. The combination as specified in claim 6 wherein said means to rotatably mount said road wheel includes a shaft fixed to said frame and means to mount said hydraulic cylinder on a portion of said shaft.

8. The combination as specified in claim 5 and means to change the effective length of one of the links on an end of said mounting bracket opposite from the connection of the mounting bracket to said power generating means whereby the mounting bracket may be inclined to provide a camber loading of a tire mounted thereon as the tire is moved against said road wheel.

9. The combination as specified in claim 8 wherein said means to change the effective length of said one link comprises a lever pivotally mounted to a main portion of said one link and to said mounting bracket at spaced pivots, and means to move said lever about its pivotal mounting to said main portion of said link and to hold said lever in a fixed position with respect to said main portion of said link.

10. The combination as specified in claim 9 and wherein the pivotally mounting of said mounting bracket to said pair of links includes a spherical bearing connection whereby the mounting bracket may be rotated about an axis perpendicular to the pivotal axes of said links to said mounting bracket, and means to control the movement of said mounting bracket about said perpendicular axis.

* * * * *